US010514253B2

(12) United States Patent
Ohyama et al.

(10) Patent No.: US 10,514,253 B2
(45) Date of Patent: Dec. 24, 2019

(54) THREE-DIMENSIONAL MEASUREMENT APPARATUS

(71) Applicant: CKD Corporation, Aichi (JP)

(72) Inventors: Tsuyoshi Ohyama, Aichi (JP); Norihiko Sakaida, Aichi (JP); Takahiro Mamiya, Aichi (JP); Hiroyuki Ishigaki, Aichi (JP)

(73) Assignee: CKD Corporation, Aichi (JP)

( * ) Notice: Subject to any disclaimer, the term of this patent is extended or adjusted under 35 U.S.C. 154(b) by 122 days.

(21) Appl. No.: 15/596,788

(22) Filed: May 16, 2017

(65) Prior Publication Data

US 2017/0248413 A1 Aug. 31, 2017

Related U.S. Application Data

(63) Continuation of application No. PCT/JP2016/050551, filed on Jan. 8, 2016.

(30) Foreign Application Priority Data

Jun. 12, 2015 (JP) ................................ 2015-118842

(51) Int. Cl.
*G01B 11/25* (2006.01)
*G01B 11/06* (2006.01)
(Continued)

(52) U.S. Cl.
CPC ...... *G01B 11/2513* (2013.01); *G01B 11/0608* (2013.01); *G01B 11/25* (2013.01); *H04N 5/2256* (2013.01); *H04N 7/183* (2013.01)

(58) Field of Classification Search
CPC . G01B 11/2513; G01B 11/0608; G01B 11/25; H04N 5/2256; H04N 7/183
(Continued)

(56) References Cited

U.S. PATENT DOCUMENTS 6,218,960 B1 * 4/2001 Ishikawa ................ G08G 1/167 340/435
8,649,019 B2 * 2/2014 Kannaka ............ G01B 11/2441 356/492
(Continued)

FOREIGN PATENT DOCUMENTS

JP 2009115612 A 5/2009
JP 2010-169433 A 8/2010
(Continued)

OTHER PUBLICATIONS

International Search Report issued in corresponding International Application No. PCT/JP2016/050551 dated Mar. 22, 2016 (2 pages).

*Primary Examiner* — Mohammed S Rahaman
*Assistant Examiner* — Jimmy S Lee
(74) *Attorney, Agent, or Firm* — Osha Liang LLP

(57) ABSTRACT

A measurement apparatus includes an illumination device irradiating an object with a first and a second pattern, a camera taking image data of the object, a motor displacing the object, and a processor measuring the object, obtaining a first value of the object based on a first number of image data taken with the first pattern at a first number of phases at a first position, obtaining a gain and/or offset based on the first number of image data, obtaining a second value of the object based on the gain and/or offset and a second number of image data taken with the second pattern at a second number of phases at a second position, obtaining height data of the object based on the first and the second value, and obtaining the second value with an average of the gain and/or offset of pixels adjacent to each pixel.

13 Claims, 11 Drawing Sheets

(51) Int. Cl.
*H04N 5/225* (2006.01)
*H04N 7/18* (2006.01)

(58) Field of Classification Search
USPC ........................................................... 348/42
See application file for complete search history.

(56) References Cited

U.S. PATENT DOCUMENTS

| | | | | |
|---|---|---|---|---|
| 2010/0183194 | A1* | 7/2010 | Umemura | G01B 11/03 382/103 |
| 2013/0128282 | A1* | 5/2013 | Ishigaki | G01B 11/245 356/610 |
| 2014/0267671 | A1* | 9/2014 | Kenny | G02B 21/26 348/79 |
| 2015/0221075 | A1* | 8/2015 | Watanabe | G06T 7/001 382/144 |

FOREIGN PATENT DOCUMENTS

| | | | |
|---|---|---|---|
| JP | 2010243438 | A | 10/2010 |
| JP | 2012053015 | A | 3/2012 |

* cited by examiner

【Fig.1】
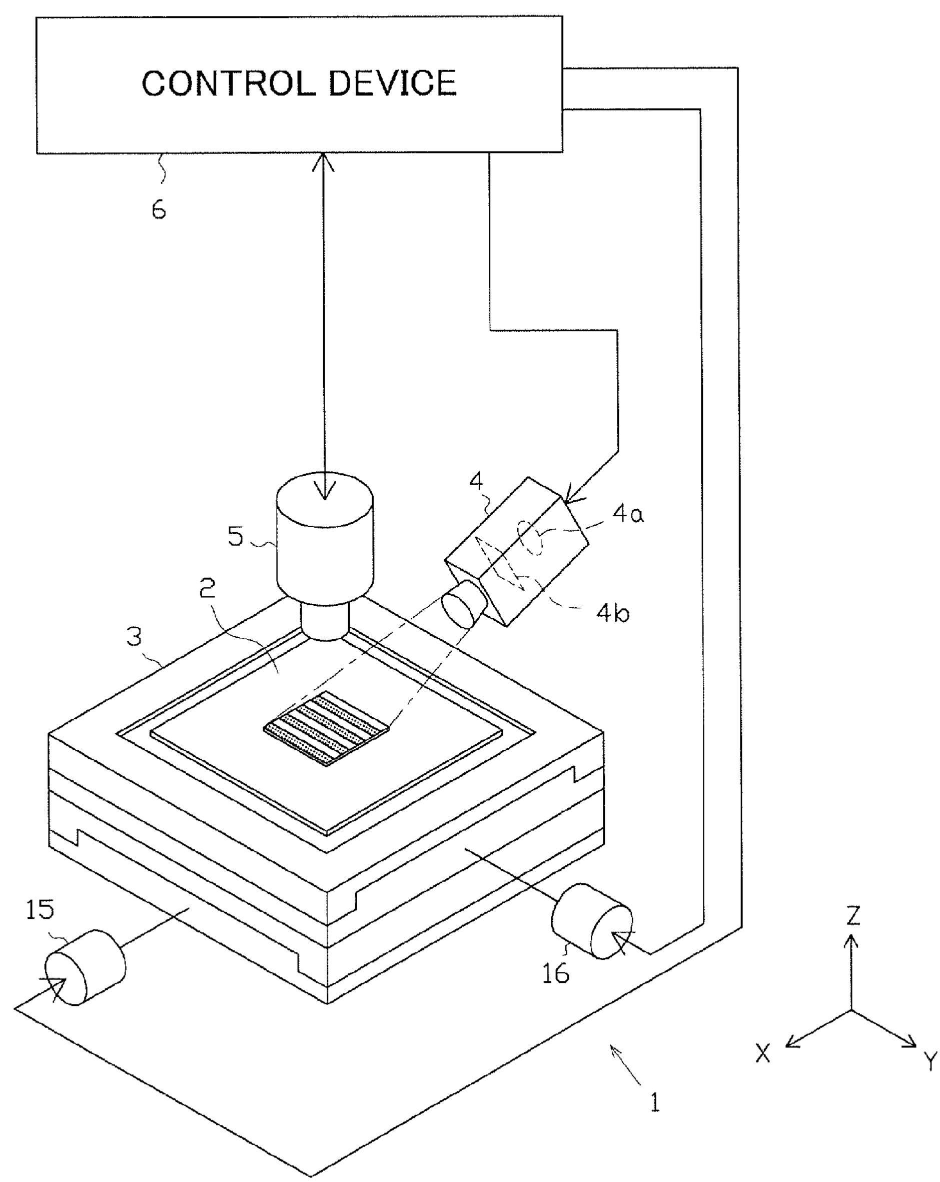

【Fig.2】
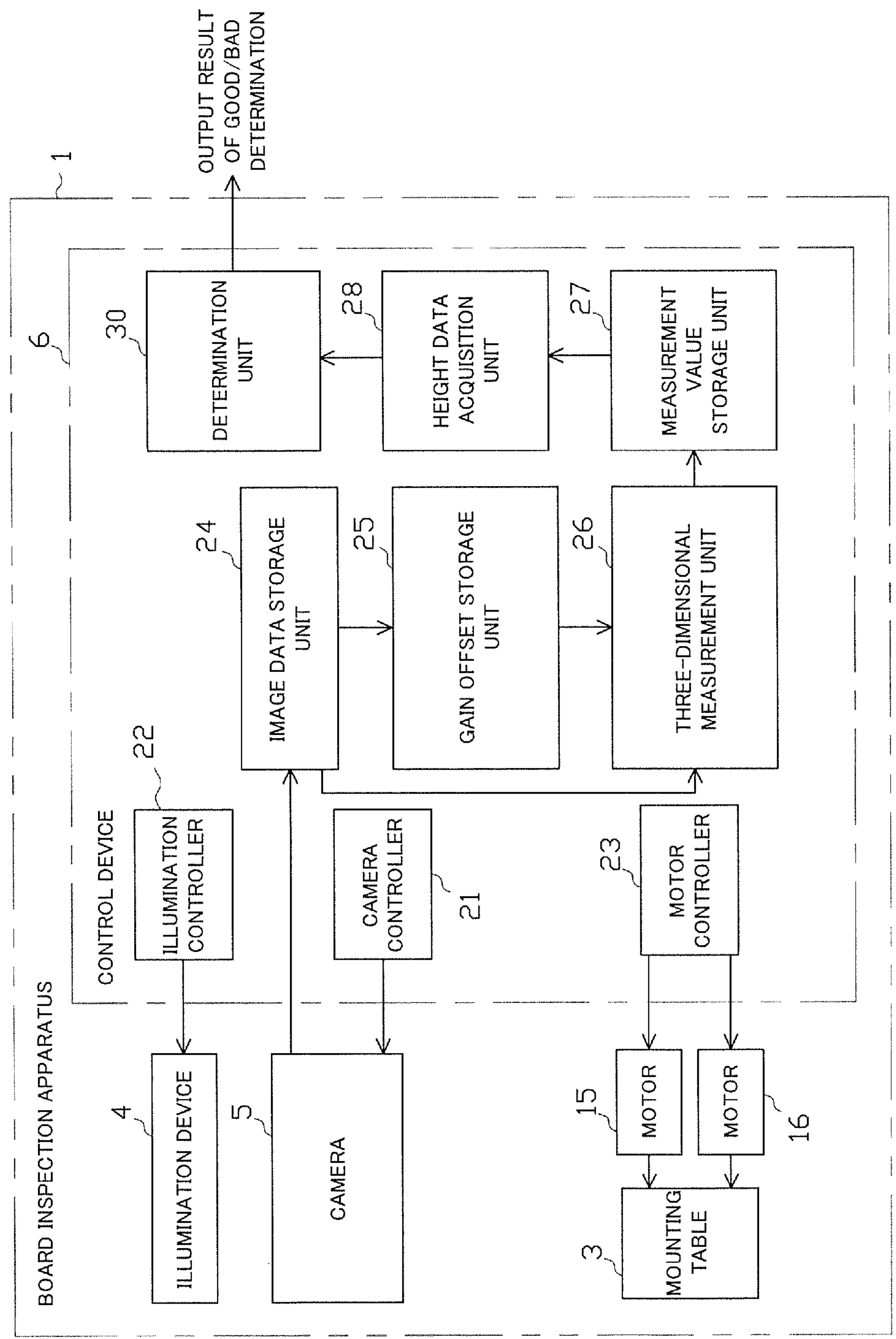

【Fig.3】

| FIRST HEIGHT RESOLUTION OF 2 μM | SECOND HEIGHT RESOLUTION OF 4 μM | ORDER | FIRST HEIGHT TAKING INTO ACCOUNT ORDER RESOLUTION OF 2 μM |
|---|---|---|---|
| 10±1 | 20±2 | SECONDARY | 20±1 |
| 8±1 | | | 18±1 |
| 6±1 | 16±2 | | 16±1 |
| 4±1 | | | 14±1 |
| 2±1 | 12±2 | | 12±1 |
| 0±1<br>10±1 | | | 10±1 |
| 8±1 | 8±2 | PRIMARY | 8±1 |
| 6±1 | | | 6±1 |
| 4±1 | 4±2 | | 4±1 |
| 2±1 | | | 2±1 |
| 0±1 | 0±2 | | 0±1 |

【Fig.4A】

| | | | |
|---|---|---|---|
| $N_1$ | $N_2$ | $N_3$ | $N_4$ |
| $N_5$ | $N_6$ | $N_7$ | $N_8$ |
| $N_9$ | $N_{10}$ | $N_{11}$ | $N_{12}$ |
| $N_{13}$ | $N_{14}$ | $N_{15}$ | $N_{16}$ |

【Fig.4B】

| | | | |
|---|---|---|---|
| $M_1$ | $M_2$ | $M_3$ | $M_4$ |
| $M_5$ | $M_6$ | $M_7$ | $M_8$ |
| $M_9$ | $M_{10}$ | $M_{11}$ | $M_{12}$ |
| $M_{13}$ | $M_{14}$ | $M_{15}$ | $M_{16}$ |

【Fig.5】

| | | | | | | | |
|---|---|---|---|---|---|---|---|
| $M_1$ | | $M_2$ | | $M_3$ | | $M_4$ | |
| | $N_1$ | | $N_2$ | | $N_3$ | | $N_4$ |
| $M_5$ | | $M_6$ | | $M_7$ | | $M_8$ | |
| | $N_5$ | | $N_6$ | | $N_7$ | | $N_8$ |
| $M_9$ | | $M_{10}$ | | $M_{11}$ | | $M_{12}$ | |
| | $N_9$ | | $N_{10}$ | | $N_{11}$ | | $N_{12}$ |
| $M_{13}$ | | $M_{14}$ | | $M_{15}$ | | $M_{16}$ | |
| | $N_{13}$ | | $N_{14}$ | | $N_{15}$ | | $N_{16}$ |

【Fig.6】
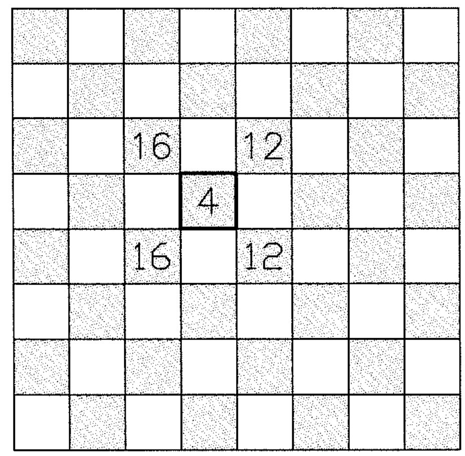
【Fig.7】
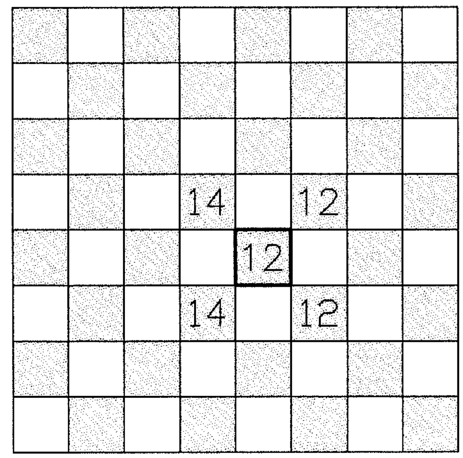

【Fig.8】
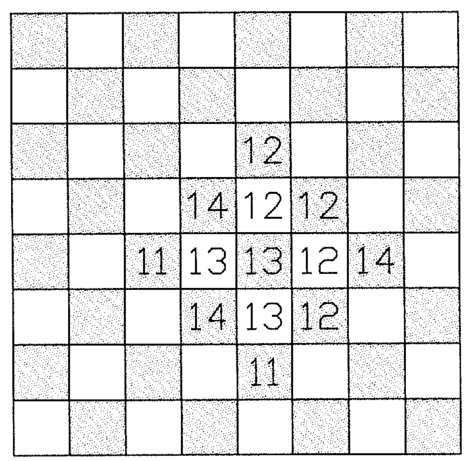

【FIG.9】

| TRUE VALUE | FIRST HEIGHT | SECOND HEIGHT | FIRST HEIGHT TAKING INTO ACCOUNT ORDER | CORRECTED SECOND HEIGHT | INTER-POLATION | MAXIMUM ERROR |
|---|---|---|---|---|---|---|
| 0 | 0 | 0 | 0 | 0 | 0 | 0 |
| 1 | 0 | 0 | 0 | 0 | 0 | −1 |
| | 2 | 0 | 2 | 2 | 1 | 1 |
| 2 | 2 | 0 | 2 | 2 | 1 | −1 |
| | 2 | 4 | 2 | 2 | 3 | 1 |
| 3 | 2 | 4 | 2 | 2 | 3 | −1 |
| | 4 | 4 | 4 | 4 | 4 | 1 |
| 4 | 4 | 4 | 4 | 4 | 4 | 0 |
| 5 | 4 | 4 | 4 | 4 | 4 | −1 |
| | 6 | 4 | 6 | 6 | 5 | 1 |
| 6 | 6 | 4 | 6 | 6 | 5 | −1 |
| | 6 | 8 | 6 | 6 | 7 | 1 |
| 7 | 6 | 8 | 6 | 6 | 7 | −1 |
| | 8 | 8 | 8 | 8 | 8 | 1 |
| 8 | 8 | 8 | 8 | 8 | 8 | 0 |
| 9 | 8 | 8 | 8 | 8 | 8 | −1 |
| | 10 | 8 | 10 | 10 | 9 | 1 |
| 10 | 10 | 8 | 10 | 10 | 9 | −1 |
| | 0 | 12 | 10 | 10 | 11 | 1 |
| 11 | 0 | 12 | 10 | 10 | 11 | −1 |
| | 2 | 12 | 12 | 12 | 12 | 1 |
| 12 | 2 | 12 | 12 | 12 | 12 | 0 |
| 13 | 2 | 12 | 12 | 12 | 12 | −1 |
| | 4 | 12 | 14 | 14 | 13 | 1 |
| 14 | 4 | 12 | 14 | 14 | 13 | −1 |
| | 4 | 16 | 14 | 14 | 15 | 1 |
| 15 | 4 | 16 | 14 | 14 | 15 | −1 |
| | 6 | 16 | 16 | 16 | 16 | 1 |
| 16 | 6 | 16 | 16 | 16 | 16 | 0 |
| 17 | 6 | 16 | 16 | 16 | 16 | −1 |
| | 8 | 16 | 18 | 18 | 17 | 1 |
| 18 | 8 | 16 | 18 | 18 | 17 | −1 |
| | 8 | 20 | 18 | 18 | 19 | 1 |
| 19 | 8 | 20 | 18 | 18 | 19 | −1 |
| | 10 | 20 | 20 | 20 | 20 | 1 |
| 20 | 10 | 20 | 20 | 20 | 20 | 0 |

【Fig.10】
| $C_1$ | $D_1$ | $C_2$ | $D_2$ | $C_3$ | $D_3$ | $C_4$ | $D_4$ |
|---|---|---|---|---|---|---|---|
| $F_1$ | $E_1$ | $F_2$ | $E_2$ | $F_3$ | $E_3$ | $F_4$ | $E_4$ |
| $C_5$ | $D_5$ | $C_6$ | $D_6$ | $C_7$ | $D_7$ | $C_8$ | $D_8$ |
| $F_5$ | $E_5$ | $F_6$ | $E_6$ | $F_7$ | $E_7$ | $F_8$ | $E_8$ |
| $C_9$ | $D_9$ | $C_{10}$ | $D_{10}$ | $C_{11}$ | $D_{11}$ | $C_{12}$ | $D_{12}$ |
| $F_9$ | $E_9$ | $F_{10}$ | $E_{10}$ | $F_{11}$ | $E_{11}$ | $F_{12}$ | $E_{12}$ |
| $C_{13}$ | $D_{13}$ | $C_{14}$ | $D_{14}$ | $C_{15}$ | $D_{15}$ | $C_{16}$ | $D_{16}$ |
| $F_{13}$ | $E_{13}$ | $F_{14}$ | $E_{14}$ | $F_{15}$ | $E_{15}$ | $F_{16}$ | $E_{16}$ |
【Fig.11】
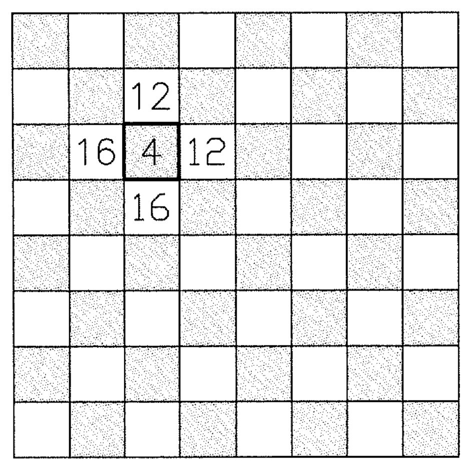

【Fig.12】
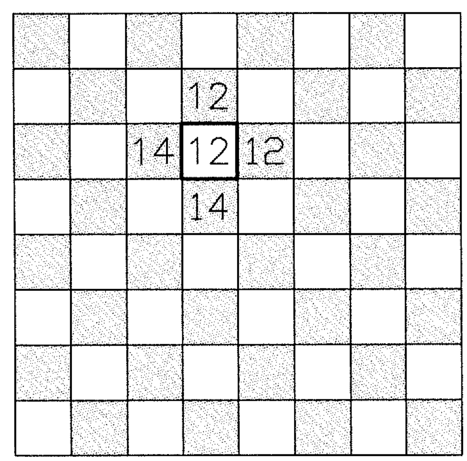

【Fig.13】

| TRUE VALUE | FIRST HEIGHT | SECOND HEIGHT | THIRD HEIGHT | FOURTH HEIGHT | FIRST AND THIRD HEIGHTS TAKING INTO ACCOUNT ORDER | CORRECTED SECOND AND FOURTH HEIGHTS | MAXIMUM ERROR |
|---|---|---|---|---|---|---|---|
| 0 | 0 | 0 | 0 | 0 | 0 | 0 | 0 |
| 1 | 0 | 0 | 0 | 0 | 0 | 0 | −1 |
| | 2 | 0 | 2 | 0 | 2 | 2 | 1 |
| 2 | 2 | 0 | 2 | 0 | 2 | 2 | −1 |
| | 2 | 4 | 2 | 4 | 2 | 2 | 1 |
| 3 | 2 | 4 | 2 | 4 | 2 | 2 | −1 |
| | 4 | 4 | 4 | 4 | 4 | 4 | 1 |
| 4 | 4 | 4 | 4 | 4 | 4 | 4 | 0 |
| 5 | 4 | 4 | 4 | 4 | 4 | 4 | −1 |
| | 6 | 4 | 6 | 4 | 6 | 6 | 1 |
| 6 | 6 | 4 | 6 | 4 | 6 | 6 | −1 |
| | 6 | 8 | 6 | 8 | 6 | 6 | 1 |
| 7 | 6 | 8 | 6 | 8 | 6 | 6 | −1 |
| | 8 | 8 | 8 | 8 | 8 | 8 | 1 |
| 8 | 8 | 8 | 8 | 8 | 8 | 8 | 0 |
| 9 | 8 | 8 | 8 | 8 | 8 | 8 | −1 |
| | 10 | 8 | 10 | 8 | 10 | 10 | 1 |
| 10 | 10 | 8 | 10 | 8 | 10 | 10 | −1 |
| | 0 | 12 | 0 | 12 | 10 | 10 | 1 |
| 11 | 0 | 12 | 0 | 12 | 10 | 10 | −1 |
| | 2 | 12 | 2 | 12 | 12 | 12 | 1 |
| 12 | 2 | 12 | 2 | 12 | 12 | 12 | 0 |
| 13 | 2 | 12 | 2 | 12 | 12 | 12 | −1 |
| | 4 | 12 | 4 | 12 | 14 | 14 | 1 |
| 14 | 4 | 12 | 4 | 12 | 14 | 14 | −1 |
| | 4 | 16 | 4 | 16 | 14 | 14 | 1 |
| 15 | 4 | 16 | 4 | 16 | 14 | 14 | −1 |
| | 6 | 16 | 6 | 16 | 16 | 16 | 1 |
| 16 | 6 | 16 | 6 | 16 | 16 | 16 | 0 |
| 17 | 6 | 16 | 6 | 16 | 16 | 16 | −1 |
| | 8 | 16 | 8 | 16 | 18 | 18 | 1 |
| 18 | 8 | 16 | 8 | 16 | 18 | 18 | −1 |
| | 8 | 20 | 8 | 20 | 18 | 18 | 1 |
| 19 | 8 | 20 | 8 | 20 | 18 | 18 | −1 |
| | 10 | 20 | 10 | 20 | 20 | 20 | 1 |
| 20 | 10 | 20 | 10 | 20 | 20 | 20 | 0 |

【Fig.14】
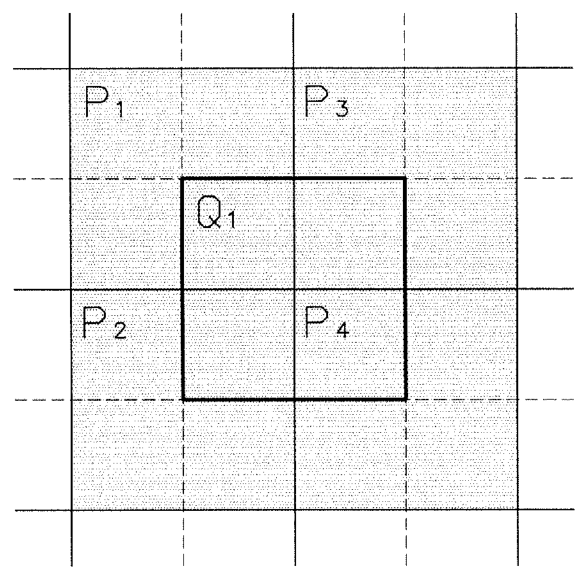

THREE-DIMENSIONAL MEASUREMENT APPARATUS

BACKGROUND OF THE INVENTION

Technical Field

The present disclosure relates to a three-dimensional measurement apparatus that performs three-dimensional measurement by using a phase shift method.

Background Art

In the case of mounting electronic components on a printed circuit board, a general procedure first prints solder paste on a predetermined electrode pattern laid on the printed circuit board. The electronic components are then temporarily fastened on the printed circuit board by taking advantage of the viscosity of the solder paste. The printed circuit board is subsequently introduced into a reflow furnace and goes through a predetermined reflow process for soldering. Recently there has been a need to inspect the printing condition of the solder paste in a stage prior to introduction into the reflow furnace. A three-dimensional measurement apparatus may be used for such inspection.

Various non-contact-type three-dimensional measurement apparatuses using light have recently been proposed. For example, techniques with regard to a three-dimensional measurement apparatus using a phase shift method have been proposed.

The three-dimensional measurement apparatus using the phase shift method irradiates a measurement object (in this case, solder paste printed on a printed circuit board) with a light pattern by means of an irradiation unit provided as a combination of a light source configured to emit a predetermined light and grids configured to convert the light emitted from the light source into a light pattern having a light intensity distribution in a sinusoidal waveform (fringe-like pattern). Respective points on the board are then observed using an imaging unit placed immediately above the board. The imaging unit used may be, for example, a CCD camera including lenses and imaging elements.

In the configuration described above, intensity (luminance) I of light in each pixel on image data taken by the imaging unit is expressed by an equation (R1) given below:

$$I=f\cdot\sin\phi+e \quad \text{(R1)}$$

where f denotes a gain, e denotes an offset and $\phi$ denotes a phase of a light pattern.

The phase of the light pattern is changed in four different stages ($\phi$+0, $\phi$+90°, $\phi$+180°, $\phi$+270°) by controlling switchover of the above grids, and image data having corresponding intensity distributions $I_0$, $I_1$, $I_2$, and $I_3$ are taken. The phase $\phi$ is then determined by cancelling f (gain) and e (offset) according to an equation (R2) given below:

$$\phi=\tan^{-1}[(I_1-I_3)/(I_2-I_0)] \quad \text{(R2)}$$

A height (Z) at each coordinates (X,Y) on the measurement object such as solder paste is then determined by using this phase $\phi$, based on the principle of triangulation.

A recently proposed three-dimensional measurement apparatus is configured to calculate first height data with respect to each pixel based on image data obtained by irradiation with a first light pattern at a first position and calculate second height data with respect to each pixel based on image data obtained by irradiation with a second light pattern at a second position that is shifted by the pitch of half a pixel in a predetermined direction from the first position, so as to ensure more accurate measurement (for example, as described in Patent Literature 1).

CITATION LIST

Patent Literature

PTL 1: JP 2010-169433A

SUMMARY OF THE INVENTION

As described above, however, three-dimensional measurement using the phase shift method requires changing the phase of the emitted light pattern in four different stages (or three different stages) to take four (or three) image data.

In the case of measurement at two different positions, this procedure first irradiates a measurement object with a first light pattern at a first position and changes the phase of the first light pattern in four different stages (or three different stages) to take four (or three) image data. The procedure subsequently changes the positional relationship between the imaging unit and the measurement object, irradiates the measurement object with a second light pattern at a second position and changes the phase of the second light pattern in four different stages (or three different stages) to take four (or three) image data. This procedure accordingly requires four (or three) imaging operations at each position, i.e., a total of eight (or six) imaging operations. This is likely to increase the imaging time significantly.

When a large number of measurement object ranges are set on one printed circuit board, the time period required for measurement of the one printed circuit board is extended by several times. There is accordingly a demand for further shortening the measurement time.

This is not necessarily limited to measurement of the height of, for example, solder paste printed on the printed circuit board but may be observed in the field of other three-dimensional measurement apparatuses.

By taking into account the circumstances described above, a three-dimensional measurement apparatus is provided, that ensures more accurate measurement in a shorter time period in three-dimensional measurement using a phase shift method.

The following describes each of various aspects of the invention. Functions and advantageous effects that are characteristic of each of the aspects are also described as appropriate.

Aspect 1: There is provided a three-dimensional measurement apparatus. The three-dimensional measurement apparatus comprises an irradiation unit configured to irradiate a measurement object with at least a light pattern having a fringe-like light intensity distribution; a phase controller configured to change a phase of the light pattern emitted from the irradiation unit to a plurality of different phases; an imaging unit configured to take an image of reflected light from the measurement object irradiated with the light pattern; a displacement unit configured to relatively displace a positional relationship between the imaging unit and the measurement object; and an image processing unit configured to perform three-dimensional measurement of the measurement object by a phase shift method, based on image data taken by the imaging unit. The image processing unit comprises a first measurement value acquisition unit configured to obtain a first measurement value with respect to each pixel, based on a first predetermined number of image data taken by irradiation with a first light pattern at the first predetermined number of phases at a first position; a gain offset acquisition unit configured to obtain a value of a gain and/or an offset with respect to each pixel, based on the first predetermined number of image data taken at the first position; a second measurement value acquisition unit configured to obtain a second measurement value with respect to each pixel by using the value of the gain and/or the offset obtained by the gain offset acquisition unit, based on a second predetermined number of image data taken by irradiation with a second light pattern at the second predetermined number of phases at a second position that is shifted by a pitch of half a pixel in a predetermined direction from the first position, wherein the second predetermined number is smaller than the first predetermined number; and a height data acquisition unit configured to obtain height data with respect to each pixel, based on the first measurement value and the second measurement value.

The configuration of the aspect 1 performs three-dimensional measurement, based on image data obtained by irradiation of the measurement object with the first light pattern at the first position and obtains the result of measurement as the first measurement value. This configuration also performs three-dimensional measurement, based on, for example, image data obtained by irradiation of the measurement object with the second light pattern at the second position that is shifted by the pitch of half a pixel in the predetermined direction from the first position, and obtains the result of measurement as the second measurement value. This configuration then obtains height data specified from the first measurement value and the second measurement value, as true height data with respect to each pixel.

This configuration can thus generate image data (including image data after image processing, for example, measurement data including height data arrayed with respect to the respective pixels) of the higher resolution than the resolution of the imaging unit (imaging element) and thereby ensures more accurate three-dimensional measurement.

Furthermore, the configuration of this aspect utilizes the values of the gain and the offset obtained from the image data taken in measurement at the first position (with the first light pattern), so as to reduce the number of pixels to be imaged (frequency of imaging) in measurement at the second position (with the second light pattern) to be smaller than the number of pixels to be imaged at the first position.

For example, the configuration may take four image data by irradiation with the first light pattern at four different phases at the first position and subsequently take one image data by irradiation with the second light pattern at one phase at the second position. This requires the total of five times of imaging and thus significantly reduces the imaging time.

Compared with a configuration that simply performs measurement at two different positions, this configuration reduces the total frequency of imaging and shortens the imaging time. As a result, this remarkably shortens the measurement time.

One example of the "second position that is shifted by the pitch of half a pixel in the predetermined direction from the first position" is a "position shifted obliquely by the pitch of half a pixel from the first position". This configuration provides image data having four times the resolution of an imaging element by only measurement at two different positions, i.e., measurement at the first position and measurement at the second position. The position shifted obliquely by the pitch of half a pixel denotes a position shifted by half a pixel in a diagonal direction (in an oblique direction relative to the direction of array) of pixels in a square shape arranged in grids in the image data.

Aspect 2: In the three-dimensional measurement apparatus described in the above aspect 1, the irradiation unit may be configured to irradiate the measurement object by switching over a plurality of light patterns having different periods. The measurement object may be irradiated at the first position with the first light pattern having a first period; and the measurement object may be irradiated at the second position with the second light pattern having a second period that is different from the first period.

The actual measurement object may have a large height or may have a small height. For example, solder paste may be formed in a thin film-like shape or may be protruded in a truncated cone shape. Extending the period (fringe pitch) of an emitted light pattern according to the maximum height of the measurement object is likely to provide a low resolution and reduce the accuracy of measurement. Narrowing the period of the light pattern, on the other hand, improves the accuracy but is likely to provide an insufficient measurement range for measurement of the height (provide a different fringe order).

According to the above aspect 2, however, the height data acquisition unit specifies the fringe order of the other measurement value (for example, first measurement value) obtained with the other light pattern (for example, first light pattern) of the shorter period, based on one measurement value (for example, second measurement value) obtained with one light pattern (for example, second light pattern) of the longer period, and replaces the other measurement value with a value taking into account the specified fringe order (data replacement unit). This configuration can thus obtain true height data with respect to each pixel.

This configuration provides both the advantageous effect of expanding the measurable height range that is the merit by using the light pattern of the longer period and the advantageous effect of ensuring accurate measurement of the high resolution that is the merit by using the light pattern of the shorter period. As a result, this allows for measurement of the high resolution in the wide measurement range and ensures more accurate measurement.

Aspect 3: In the three-dimensional measurement apparatus described in either the above aspect 1 or the above aspect 2, the second measurement value acquisition unit may use an average of the gain and/or an average of the offset in peripheral locations of a predetermined pixel, so as to obtain the second measurement value with respect to the predetermined pixel.

The image data taken at the first position and the image data taken at the second position are image data taken at the positions shifted from each other by the pitch of half a pixel. Accordingly, the imaging ranges (surfaces of the measurement object) included in each pixel of the respective image data are not identical with each other. The values of the gain and the offset with respect to each pixel depend on the characteristic (for example, reflectivity) on the surface of the measurement object included in the range of the pixel. Accordingly, the values of the gain and the offset with respect to a predetermined pixel obtained based on the image data taken at the first position is likely to be not optimum in obtaining the second measurement value with respect to the predetermined pixel.

The configuration of the above aspect 3 is, however, configured to use the average of the gain and/or the average of the offset in the peripheral locations of the predetermined pixel, so as to obtain the second measurement value with respect to the predetermined pixel. This configuration can obtain the more appropriate second measurement value.

Aspect 4: In the three-dimensional measurement apparatus described in any one of the above aspects 1 to 3, when the second predetermined number is equal to 1, the second measurement value acquisition unit may calculate a phase θ of the second light pattern that satisfies at least a relation expressed by an equation (S1) given below, so as to obtain the second measurement value:

$$V_0=A\sin\theta+B \quad (S1)$$

where $V_0$ denotes a luminance value, A denotes a gain and B denotes an offset.

The configuration of the above aspect 4 requires imaging only once at the second position. This more effectively provides the functions and the advantageous effects of the above aspect or the like.

An equation (S2) given below is derived by organizing the above equation S1) with respect to "sin θ":

$$\sin\theta=\{(V_0-B)/A\} \quad (S2)$$

An equation (S3) given below is derived by solving the above equation (S2) with respect to the phase θ:

$$\theta=\sin^{-1}\{(V_0-B)/A\} \quad (S3)$$

As shown above, the phase θ is specified, based on the known luminance value $V_0$ obtained with the second light pattern and the known gain A and offset B obtained with the first light pattern.

Aspect 5: In the three-dimensional measurement apparatus described in any one of the above aspects 1 to 3, when the second predetermined number is equal to 2, the second measurement value acquisition unit may calculate a phase θ of the second light pattern that satisfies at least relations expressed by equations (T1) and (T2) given below, so as to obtain the second measurement value:

$$V_0=A\sin\theta+B \quad (T1)$$

$$V_1=A\sin(\theta+90°)+B \quad (T2)$$

where $V_0$ and $V_1$ denote luminance values of two image data, A denotes a gain and B denotes an offset.

The configuration of the above aspect 5 requires imaging only twice with the second light pattern at two different phases by 90 degrees. This more effectively provides the functions and the advantageous effects of the above aspect or the like.

An equation (T3) given below is derived from the above equation (T2):

$$V_1=A\sin(\theta+90°)+B=A\cos\theta+B \quad (T3)$$

An equation (T4) given below is derived by organizing the above equation (T3) with respect to "cos θ":

$$\cos\theta=(V_1-B)/A \quad (T4)$$

An equation (T5) given below is derived by organizing the above equation (T1) with respect to "sin θ":

$$\sin\theta=(V_0-B)/A \quad (T5)$$

An equation (T7) given below is derived by substituting the above equations (T4) and (T5) into an equation (T6) given below:

$$\tan\theta=\sin\theta/\cos\theta \quad (T6)$$

$$=\{(V_0-B)/A\}/\{V_1-B)/A\} \quad (T7)$$
$$=(V_0-B)/(V_1-B)$$

An equation (T8) given below is derived by solving the above equation (T7) with respect to the phase θ:

$$\theta=\tan^{-1}\{(V_0-B)/(V_1-B)\} \quad (T8)$$

As shown above, the phase θ is specified, based on the known luminance values $V_0$ and $V_1$ obtained with the second light pattern and the known offset B obtained with the first light pattern.

The configuration of the above aspect determines the phase θ according to the arithmetic equation using "$\tan^{-1}$". This allows for measurement of the height in the range of 360 degrees from −180 degrees to 180 degrees and thereby further expands the measurement range.

Aspect 6: In the three-dimensional measurement apparatus described in any one of the above aspects 1 to 5, the measurement object may be one of solder paste printed on a printed circuit board and a solder bump formed on a wafer substrate.

The configuration of the above aspect 6 can perform measurement of the height or the like of the solder paste printed on the printed circuit board or the solder bump formed on the wafer substrate. In inspection of the solder paste or the solder bump, this configuration can thus determine whether the solder paste or the solder bump is good or bad, based on the measurement value. In such inspection, the functions and the advantageous effects of each of the aspects described above are thus provided. This ensures good/bad determination with the high accuracy. As a result, this improves the inspection accuracy of a solder printing inspection apparatus or a solder bump inspection apparatus.

BRIEF DESCRIPTION OF THE DRAWINGS

FIG. 1 is a schematic configuration diagram schematically illustrating a board inspection apparatus according to one or more embodiments of the invention;

FIG. 2 is a block diagram illustrating the electrical configuration of the board inspection apparatus according to one or more embodiments of the invention;

FIG. 3 is a diagram showing resolutions of respective light patterns according to one or more embodiments of the invention;

FIGS. 4A and 4B are diagrams illustrating data arrays of obtained height measurement values according to one or more embodiments of the invention;

FIG. 5 is a diagram illustrating a data array of combined first height measurement values and second height measurement values according to one or more embodiments of the invention;

FIG. 6 is a diagram illustrating a concrete example of a data replacement process according to one or more embodiments of the invention;

FIG. 7 is a diagram illustrating a concrete example of a correction process according to one or more embodiments of the invention;

FIG. 8 is a diagram illustrating a concrete example of an interpolation process according to one or more embodiments of the invention;

FIG. 9 is a diagram showing accuracies of respective height data relative to true values according to one or more embodiments of the invention;

FIG. 10 is a diagram illustrating a data array of combined first to fourth height measurement values according to one or more embodiments of the invention;

FIG. 11 is a diagram illustrating a concrete example of the data replacement process according to one or more embodiments of the invention;

FIG. 12 is a diagram illustrating a concrete example of the correction process according to one or more embodiments of the invention;

FIG. 13 is a diagram showing accuracies of respective height data relative to true values according to one or more embodiments of the invention; and FIG. 14 is a diagram illustrating a relationship between a pixel as a measurement object and gains and offsets used for determining a measurement value according to one or more embodiments of the invention.

DETAILED DESCRIPTION

First Embodiment

The following describes one embodiment with reference to the drawings. FIG. 1 is a schematic configuration diagram schematically illustrating a board inspection apparatus 1 equipped with a three-dimensional measurement apparatus according to this embodiment. As shown in this drawing, the board inspection apparatus 1 includes a mounting table 3 on which a printed circuit board 2 with solder paste printed thereon as a measurement object is placed, an illumination device 4 provided as the irradiator configured to irradiate a surface of the printed circuit board 2 with a predetermined light pattern emitted obliquely downward, a camera 5 provided as the imaging unit configured to take an image of an irradiated portion on the printed circuit board 2 that is irradiated with the light pattern, and a control device 6, which includes at least a processor and associated memory, configured to perform various controls, image processing and arithmetic processing in the board inspection apparatus 1.

Motors 15 and 16 are provided as the displacement unit on the mounting table 3. The control device 6 (motor controller 23) drives and controls these motors 15 and 16, so as to slide the printed circuit board 2 mounted on the mounting table 3 in an arbitrary direction (in an X-axis direction and a Y-axis direction).

The illumination device 4 includes a light source 4*a* configured to emit a predetermined light, and liquid crystal grids 4*b* configured to convert the light emitted from the light source 4*a* into a light pattern having a light intensity distribution in a sinusoidal waveform (fringe-like pattern). The illumination device 4 is accordingly configured to irradiate the printed circuit board 2 with a fringe-like light pattern that is emitted obliquely downward and changes its phase to a plurality of different phases.

For example, the light emitted from the light source 4*a* is introduced into a pair of condenser lenses by optical fibers to be changed to parallel beams of light. The parallel beams of light are introduced to a projection lens via the liquid crystal grids 4*b*. The printed circuit board 2 is then irradiated with the fringe-like light pattern emitted from the projection lens.

According to this embodiment, the light pattern is set to be emitted along the X-axis direction and parallel to a pair of sides of the printed circuit board 2 in a rectangular shape. Accordingly the light pattern is emitted such that the fringes of the light pattern are perpendicular to the X-axis direction and are parallel to the Y-axis direction.

The liquid crystal grids 4*b* include a liquid crystal layer that is formed between a pair of transparent substrates, a common electrode that is placed on one of the transparent substrates, and a plurality of strip electrodes that are arranged in parallel on the other transparent substrate to be opposed to the common electrode. Switching elements (for example, thin-film transistors) that are respectively connected with the respective strip electrodes are controlled on and off by a drive circuit, so as to regulate a voltage that is to be applied to each of the strip electrodes. This changes over the light transmittance of each grid line corresponding to each strip electrode, so as to form a fringe-like grid pattern consisting of "bright portions" of high light transmittance and "dark portions" of low light transmittance. The light emitted to irradiate the printed circuit board 2 via the liquid crystal grids 4*b* provides a light pattern having a light intensity distribution in a sinusoidal waveform due to, for example, unsharpness caused by diffraction.

The illumination device 4 is configured to switch over a light pattern to be emitted among a plurality of light patterns having different periods (different fringe pitches). According to this embodiment, the illumination device 4 switches over a light pattern to be emitted between two light patterns, i.e., a first light pattern having a period of 10 μm (height resolution of 2 μm) and a second light pattern having a double period of 20 μm (height resolution of 4 μm). In this embodiment, "10 μm" corresponds to "first period" and "20 μm" corresponds to "second period".

For example, the first light pattern having the period of 10 μm may be emitted by controlling the liquid crystal grids 4*b* to generate, for example, a light pattern in a sinusoidal waveform having a width of four grid lines (two grid lines of "bright portions" and two grid lines of "dark portions") as one period.

The second light pattern having the period of 20 μm may be emitted, on the other hand, by generating a light pattern in a sinusoidal waveform having a width of eight grid lines (four grid lines of "bright portions" and four grid lines of "dark portions") as one period.

As shown in FIG. 3, the first light pattern may be used to measure the height in a range of 0 urn to 10 μm (10 μm corresponds to 0 μm in a higher fringe order) by every "2 (μm)" with accuracy in an error range of ±1 (μm), for example, "0±1 (μm)", "2±1 (μm)", and "4±1 (μm)". The second light pattern may be used, on the other hand, to measure the height in a range of 0 μm to 20 μm by every "4 (μm)" with accuracy in an error range of ±2 (μm), for example, "0±2 (μm)", "4±2 (μm)", and "8±2 (μm)".

The camera 5 includes, for example, lenses and imaging elements. The imaging elements employed herein are CMOS sensors. The imaging elements employed are, however, not limited to this embodiment but may be, for example, CCD sensors. The camera 5 of this embodiment may generate an image, for example, having the resolution of 512 pixels in the X-axis direction and 480 pixels in the Y-axis direction. The horizontal resolution is, however, not limited to this embodiment.

Image data taken by the camera 5 is converted into a digital signal inside of the camera 5 and is input in the form of digital signal to the control device 6 (image data storage unit 24). The control device 6 then performs, for example, image processing and an inspection process described later, based on the input image data. In this sense, the control device 6 implements the image processing unit.

The following describes the electrical configuration of the control device 6. As shown in FIG. 2, the control device 6 includes a camera controller 21 configured to control the imaging timing of the camera 5, an illumination controller 22 configured to control the illumination device 4, a motor controller 23 configured to control the motors 15 and 16, an image data storage unit 24 configured to store image data (luminance data) taken by the camera 5, a gain offset storage unit 25 configured to store the values of a gain A and an offset B calculated based on the image data as described later, a three-dimensional measurement unit 26 configured to perform three-dimensional measurement based on at least the image data, a measurement value storage unit 27 configured to store results of measurement by the three-dimensional measurement unit 26, a height data acquisition unit 28 configured to obtain true height data (absolute height data) based on the measurement values stored in the measurement value storage unit 27, and a determination unit 30 configured to inspect the printing condition of solder paste based on the height data obtained by the height data acquisition unit 28. The illumination controller 22 configured to control the illumination device 4 (liquid crystal grids 4*b*) implements the phase controller according to this embodiment.

Although not being specifically illustrated, the board inspection apparatus 1 includes, for example, an input unit configured to include, for example, a keyboard and a touch panel, a display unit configured to include a display screen such as CRT or liquid crystal screen, a storage unit configured to store, for example, results of inspection, and an output unit configured to output, for example, the results of inspection to, for example, a solder printing machine.

The following describes an inspection procedure of the printed circuit board 2 by the board inspection apparatus 1 with reference to an inspection routine performed with respect to each inspection area. This inspection routine is performed by the control device 6.

The control device 6 (motor controller 23) first drives and controls the motors 15 and 16 to move the printed circuit board 2 and adjust the field of view of the camera 5 to a first position in a predetermined inspection area on the printed circuit board 2. The inspection area herein denotes each of divisional areas provided by dividing the surface of the printed circuit board 2 in advance as the size of the field of view of the camera 5 as one unit.

The control device 6 (illumination controller 22) subsequently controls switchover of the liquid crystal grids 4*b* of the illumination device 4 to set the configuration of grids formed by the liquid crystal grids 4*b* corresponding to the period (fringe pitch) of the first light pattern and adjust the position of the grids to a predetermined reference position (phase of "0 degree").

On completion of the switchover and setting of the liquid crystal grids 4*b*, the control device 6 (illumination controller 22) triggers light emission from the light source 4*a* of the illumination device 4 to start irradiation with the first light pattern and sequentially shifts the phase of the first light pattern by 90 degrees each to four different phases (phase of "0 degree", phase of "90 degrees", phase of "180 degrees" and phase of "270 degrees").

The control device 6 (camera controller 21) drives and controls the camera 5 to take an image of an inspection area portion (first position) irradiated with the first light pattern every time the phase of the first light pattern is sequentially shifted. The control device 6 accordingly obtains four image data taken with the first light pattern shifted in phase by 90 degrees each with respect to the first position in the predetermined inspection area. The image data taken by the camera 5 are transferred to and stored in the image data storage unit 24.

The control device 6 (three-dimensional measurement unit 26) then calculates a phase $\theta_1$ of the first light pattern with respect to each pixel from the above four image data (luminance values) by the phase shift method.

Luminance values $V_{10}$, $V_{11}$, $V_{12}$ and $V_{13}$ of the above four image data with respect to each pixel are expressed by equations (H1), (H2), (H3) and (H4) given below:

[Math. 1]

$$V_{10}=A \sin \theta_1+B \quad \text{(H1)}$$

$$V_{11}=A \sin(\theta_1+90°)+B=-A \cos \theta_1+B \quad \text{(H2)}$$

$$V_{12}=A \sin(\theta_1+180°)+B=-A \sin \theta_1+B \quad \text{(H3)}$$

$$V_{13}=A \sin(\theta_1+270°)+B=-A \cos \theta_1+B \quad \text{(H4)}$$

wherein A denotes a gain and B denotes an offset.

An equation (H5) given below is derived by solving the above equations (H1), (H2), (H3) and (H4) with respect to the phase $\theta_1$:

[Math. 2]

$$\theta_1=\tan^{-1}\{(V_{10}-V_{12})/(V_{11}-V_{13})\} \quad \text{(H5)}$$

The control device 6 subsequently calculates a first height measurement value (first measurement value) with respect to each pixel using the phase $\theta_1$ calculated as described above, based on the principle of triangulation, and stores the calculated first height measurement value in the measurement value storage unit 27. This series of processing functions implement the first measurement value acquisition unit according to this embodiment.

The control device 6 then specifies a gain A and an offset B with respect to each pixel from the four image data taken at the first position with the first light pattern. This processing function implements the gain offset acquisition unit according to this embodiment. The process of calculating the gain A and the offset B is performed in parallel with the process of calculating the first height measurement value described above, after acquisition of the four image data as described above.

The following describes a detailed procedure of calculating the gain A and the offset B. The relationships of the luminance values $V_{10}$, $V_{11}$, $V_{12}$ and $V_{13}$ of the four image data with respect to each pixel to the gain A and the offset B are expressed by the above equations (H1) to (H4).

An equation (H6) given below is derived by summing up the luminance values $V_{10}$, $V_{11}$, $V_{12}$ and $V_{13}$ of the four image data and organizing the above equations (H1) to (H4) as shown in [Math. 3] given below:

[Math. 3]

$$V_{10}+V_{11}+V_{12}+V_{13}=(A \sin \theta_1+B)+(A \cos \theta_1+B)+(-A \sin \theta_1+B)+(-A \cos \theta_1+B)=4B$$

$$(V_{10}+V_{11}+V_{12}+V_{13})/4 \quad \text{(H6)}$$

An equation (H7) given below is derived from the above equations (H1) and (H3):

[Math. 4]

$$\sin \theta_1=(V_{10}-V_{12})/2A \quad \text{(H7)}$$

since $V_{10}-V_{12}=2A \sin \theta_2$.

An equation (H8) given below is similarly derived from the above equations (H2) and (H4):

[Math. 5]

$$\cos \phi_1=(V_{11}-V_{13})/2A \quad \text{(H8)}$$

since $V_{11}-V_{13}=2A \cos \theta_1$.

An equation (H10) given below is derived by substituting the above equations (H7) and (H8) into an equation (H9) given below and organizing the equation (H9) as shown in [Math. 6] given below:

[Math. 6]

$$1=\sin^2\theta_1+\cos^2\theta_1 \tag{H9}$$
$$1=\{(V_{10}-V_{12})/2A\}^2+\{(V_{11}-V_{13})/2A\}^2$$
$$4A^2=(V_{10}-V_{12})^2+(V_{11}-V_{13})^2$$
$$A=\sqrt{\frac{(V_{10}-V_{12})^2+(V_{11}-V_{13})^2}{4}} \tag{H10}$$

wherein A>0.

The gains A and the offsets B calculated with respect to the respective pixels are stored in the gain offset storage unit 25.

After termination of a series of imaging process using the above first light pattern or during the process of calculating the first height measurement value and the process of calculating the gain A and the offset B described above, the control device 6 (motor controller 23) drives and controls the motors 15 and 16 to move the printed circuit board 2 from the above first position obliquely by the pitch of half a pixel and adjust the field of view of the camera 5 to a second position in the predetermined inspection area on the printed circuit board 2. Each pixel according to this embodiment is in a square shape having parallel sides both in the X-axis direction and in the Y-axis direction. Accordingly, moving obliquely by the pitch of half a pixel means moving in a diagonal direction of a pixel by half the distance of a diagonal line.

At the same time, the control device 6 (illumination controller 22) controls switchover of the liquid crystal grids 4*b* of the illumination device 4 to set the configuration of grids formed by the liquid crystal grids 4*b* corresponding to the period (fringe pitch) of the second light pattern and adjust the position of the grids to a predetermined reference position (phase of "0 degree").

On completion of the positioning of the printed circuit board 2 and the switchover and setting of the illumination device 4, the control device 6 starts an imaging process using the second light pattern.

For example, the control device 6 triggers light emission from the light source 4*a* of the illumination device 4 by means of the illumination controller 22 to start irradiation with the second light pattern, while driving and controlling the camera 5 by means of the camera controller 21 to take an image of an inspection area portion (second position) irradiated with the second light pattern. The image data taken by the camera 5 are transferred to and stored in the image data storage unit 24.

The imaging process using the second light pattern according to this embodiment is performed only once with the second light pattern at the phase of "0 degree". According to this embodiment, only one image data taken with the second light pattern at the phase of "0 degree" are accordingly obtained with respect to the second position in the predetermined inspection area.

The control device 6 (three-dimensional measurement unit 26) then calculates a phase $\theta_2$ of the second light pattern with respect to each pixel, based on the one image data (luminance values) taken with the second light pattern at the second position and the values of the gain A and the offset B stored in the gain offset storage unit 25.

A luminance value $V_{20}$ of the above one image data with respect to each pixel is expressed by an equation (H11) given below:

[Math. 7]

$$V_{20}=A\sin\theta_2+B \tag{H11}$$

An equation (H12) given below is derived by solving the above equation (H11) with respect to the phase $\theta_2$:

[Math. 8]

$$\sin\theta_2=(V_{20}-B)/A$$
$$\theta_2=\sin^{-1}\{(V_{20}-B)/A\} \tag{H12}$$

According to this embodiment, the values of the gain A and the offset B used herein are obtained at an identical position of coordinates (identical pixel) of the imaging element.

The control device 6 subsequently calculates a second height measurement value (second measurement value) with respect to each pixel using the phase $\theta_2$ calculated as described above, based on the principle of triangulation, and stores the calculated second height measurement value in the measurement value storage unit 27. This series of processing functions implement the second measurement value acquisition unit according to this embodiment.

The control device 6 (height data acquisition unit 28) subsequently obtains true height data with respect to the entire inspection area, based on the first measurement values and the second measurement values stored in the measurement value storage unit 27.

The control device 6 (height data acquisition unit 28) first combines the results of measurement obtained at the first position (first height measurement values) and the results of measurement obtained at the second position (second height measurement values) and performs image processing to summarize the composite results as one measurement result with respect to the inspection area. This processing provides the measurement result equivalent to the measurement result obtained by imaging with an imaging unit that has four times the resolution of the camera 5. The following describes the details of this image processing.

The following description is on the assumption that the resolution of the camera 5 is 4×4 pixels per field of imaging view. In this case, as the results of measurement obtained at the first position, first height measurement values $N_1$ to $N_{16}$ with respect to the respective pixels are stored as shown in FIG. 4A. Similarly, as the results of measurement obtained at the second position, second height measurement values $M_1$ to $M_{16}$ with respect to the respective pixels are stored as shown in FIG. 4B. FIGS. 4A and 4B are diagrams schematically showing data arrays (the same applies to FIGS. 5 to 8).

In this case, the combining process first generates data including the first height measurement values $N_1$ to $N_{16}$ and the second height measurement values $M_1$ to $M_{16}$ arranged in a checkered pattern in 8×8 squares as shown in FIG. 5. The vacant squares in FIG. 5 denote data missing portions at this stage. In order to improve the visualization, as a matter of convenience, squares are filled with dots in the checkered pattern in FIG. 5 (the same applies to FIGS. 6 to 8).

A data replacement process is subsequently performed with respect to the first height measurement values $N_1$ to $N_{16}$ to replace the first height measurement values $N_1$ to $N_{16}$ with the values taking into account the fringe order. This process implements the function of the data replacement unit according to this embodiment.

For example, as shown in FIG. 6, attention is focused on, for example, a first height measurement value $N_6$ in a square surrounded by the thick line. A value "4" obtained by the measurement at the first position is stored as the first height measurement value $N_6$. Values "16", "12, "16, and "12" are respectively stored as four surrounding second height measurement values $M_6$, $M_7$, $M_{10}$ and $M_{11}$ adjacent to the first height measurement value $N_6$. Although only these values are shown in FIG. 6, respective height measurement values are similarly stored in all the other positions in the actual state (the same applies to FIGS. 7 and 8).

As clearly understood from the table of FIG. 3, when the value of "4(±1) μm" is obtained as the first height measurement value, different fringe orders provide different candidate values "4(±1) μm" and "14(±1) μm" for the true height of solder paste (coordinates to be measured). The fringe order of 1 provides "4(±1) μm" as the actual height, and the fringe order of 2 provides "14(±1) μm" as the actual height. According to this embodiment, for convenience of explanation, the description is on the assumption that the height of solder paste (coordinates to be measured) does not exceed 20 μm.

The data replacement process employs a value closer to an average [(16+12+16+12)/4=14] of the second height measurement values $M_6$, $M_7$, $M_{10}$ and $M_{11}$ surrounding the first height measurement value $N_6$, between these candidate values "4" and "14" as the optimum value. In other words, this specifies a fringe order in the phase shift method. The data replacement process then replaces the first height measurement value $N_6$ with the value "14" taking into account the fringe order. This series of processing is similarly performed for the respective first height measurement values $N_1$ to $N_{16}$.

A correction process is subsequently performed to correct the second height measurement values $M_1$ to $M_{16}$, based on the first height measurement values $N_1$ to $N_{16}$ taking into account the fringe order. This process implements the function of the correction unit according to this embodiment.

For example, as shown in FIG. 7, attention is focused on, for example, a second height measurement value $M_{11}$ in a square surrounded by the thick line. A value "12" obtained by the measurement at the second position is stored as the second height measurement value $M_{11}$. Values "14", "12, "14, and "12" after the above replacement process are respectively stored as four surrounding first height measurement values $N_6$, $N_7$, $N_{10}$ and $N_{11}$ adjacent to the second height measurement value $M_{11}$.

The correction process first calculates an average [(14+12+14+12)/4=13] of these four surrounding first height measurement values $N_6$, $N_7$, $N_{10}$ and $N_{11}$. The correction process subsequently determines whether the second height measurement value $M_{11}$ is within the error range "±2" of this average.

When it is determined that the second height measurement value $M_{11}$ is within the error range "±2", it is estimated that the shape of solder paste (coordinates to be measured) corresponding to this second height measurement value $M_{11}$ and its periphery is a relatively gentle continuous shape. The average of the first height measurement values $N_6$, $N_7$, $N_{10}$ and $N_{11}$ is accordingly employed as the optimum value for the second height measurement value $M_{11}$.

When it is determined that the second height measurement value $M_{11}$ is not within the error range "±2", on the other hand, it is estimated that the shape of solder paste (coordinates to be measured) corresponding to this second height measurement value $M_{11}$ and its periphery is a relatively rough discontinuous shape. The observed data of the second height measurement value $M_{11}$ is accordingly employed as the optimum value.

A data interpolation process is subsequently performed to interpolate data in the data missing portions (vacant squares in FIG. 5). This process implements the function of the interpolation unit according to this embodiment.

For example, as shown in FIG. 8, the data interpolation process calculates an average based on respective data of the first height measurement values $N_1$ to $N_{16}$ after the replacement process and the second height measurement values $M_1$ to $M_{16}$ after the correction process that are arranged adjacent to and surround a predetermined data missing portion and employs the calculated average as an interpolation value of the predetermined data missing portion.

The above series of processing results in generating measurement data that has the accuracy equivalent to the accuracy of measurement data that is obtained from image data taken in 8×8 pixels with respect to the entire field of imaging view (inspection area).

The control device 6 (determination unit 30) detects a printing range of solder paste that is higher than a reference plane, based on the measurement data of the inspection area thus obtained (true height data with respect to the respect pixels), and integrates the heights of the respective locations in the detected range, so as to calculate the amount of printed solder paste.

The control device 6 (determination unit 30) subsequently compares the obtained data regarding, for example, the position, the area, the height or the amount of solder paste with reference data stored in advance and determines whether the printing condition of solder paste is good or bad in the inspection area, based on whether the result of comparison is within an allowable range.

During this process, the control device 6 drives and controls the motors 15 and 16 to move the printed circuit board 2 to a next inspection area. The above series of processing is repeatedly performed with respect to all the inspection areas, so that inspection of the entire printed circuit board 2 is terminated.

As described above in detail, this embodiment performs three-dimensional measurement, based on image data obtained by irradiation of the printed circuit board 2 with the first light pattern of the first period (period of 10 μm) at the first position, and obtains the result of measurement as the first measurement value. The embodiment also performs three-dimensional measurement, based on, for example, image data obtained by irradiation of the printed circuit board 2 with the second light pattern of the second period (period of 20 μm) at the second position that is shifted obliquely by the pitch of half a pixel from the first position, and obtains the result of measurement as the second measurement value. This embodiment then obtains height data specified from the first measurement value and the second measurement value, as true height data. This generates image data (measurement data) having four times the resolution of the camera 5 and thereby ensures more accurate three-dimensional measurement.

Furthermore, this embodiment utilizes the values of the gain and the offset obtained from the image data taken in measurement at the first position (with the first light pattern), so as to reduce the number of pixels to be imaged (frequency of imaging) in measurement at the second position (with the second light pattern) to be smaller than the number of pixels to be imaged at the first position.

This embodiment also utilizes the values of the gain A and the offset B obtained from the image data taken in measurement with the first light pattern, so as to reduce the number of pixels to be imaged (frequency of imaging) in measurement with the second light pattern to be smaller than the number of pixels to be imaged in measurement with the first light pattern.

In a concrete example, the embodiment may take four image data by irradiation with the first light pattern at four different phases at the first position and subsequently take one image data by irradiation with the second light pattern at one phase at the second position. This requires the total of five times of imaging and thus significantly reduces the imaging time.

Compared with a configuration that simply performs measurement at two different positions, this configuration reduces the total frequency of imaging and shortens the imaging time. As a result, this remarkably shortens the measurement time.

Additionally, this embodiment specifies the fringe order of the first height measurement values obtained with the first light pattern of the shorter period (period of 10 μm), based on the second height measurement values obtained with the second light pattern of the longer period (period of 20 The embodiment subsequently replaces the first height measurement values with appropriate values taking into account the specified fringe order, so as to obtain true height data with respect to the respective pixels.

This configuration provides both the advantageous effect of expanding the measurable height range that is the merit by using the second light pattern of the longer period and the advantageous effect of ensuring accurate measurement of the high resolution that is the merit by using the first light pattern of the shorter period. As a result, this allows for measurement of the high resolution in the wide measurement range as shown in FIG. 9 and ensures more accurate measurement.

The embodiment also performs the data interpolation process to calculate the average based on the respective data of the first height measurement values after the replacement process and the second height measurement values after the correction process that are arranged adjacent to and surround a predetermined data missing portion and to employ the calculated average as the interpolation value of the predetermined data missing portion. This configuration suppresses, for example, the occurrence of data missing portions, in generation of data of the high resolution by combining the first height measurement values and the second height measurement values.

Furthermore, the embodiment performs the correction process to correct the second height measurement value, based on the first height measurement values of the higher accuracy taking into account the fringe order. This makes the second height measurement value closer to the true value.

Second Embodiment

The following describes a second embodiment. With regard to the configuration overlapping with that of the first embodiment described above, the description is omitted with using the same component names and the same reference signs. The following mainly describes the different configuration from that of the first embodiment.

In three-dimensional measurement according to this embodiment, the control device 6 first drives and controls the motors 15 and 16 to move the printed circuit board 2 and adjust the field of view of the camera 5 to a first position in a predetermined inspection area on the printed circuit board 2.

The control device 6 subsequently controls switchover of the liquid crystal grids 4*b* of the illumination device 4 to set the configuration of grids formed by the liquid crystal grids 4*b* corresponding to the period (fringe pitch) of a first light pattern and adjust the position of the grids to a predetermined reference position (phase of "0 degree").

On completion of the switchover and setting of the liquid crystal grids 4*b*, the control device 6 triggers light emission from the light source 4*a* of the illumination device 4 to start irradiation with the first light pattern and sequentially shifts the phase of the first light pattern by 90 degrees each to four different phases (phase of "0 degree", phase of "90 degrees", phase of "180 degrees" and phase of "270 degrees").

The control device 6 takes an image of an inspection area portion (first position) irradiated with the first light pattern every time the phase of the first light pattern is sequentially shifted, so as to obtain four image data.

The control device 6 then calculates a phase $\theta_1$ of the first light pattern with respect to each pixel from the above four image data (luminance values) by the phase shift method.

The control device 6 subsequently calculates a first height measurement value with respect to each pixel using the phase $\theta_1$ calculated as described above, based on the principle of triangulation, and stores the calculated first height measurement value in the measurement value storage unit 27.

The control device 6 also specifies a gain A and an offset B with respect to each pixel from the above four image data and stores the specified gain A and offset B in the gain offset storage unit 25.

During this process, the control device 6 drives and controls the motors 15 and 16 to move the printed circuit board 2 to a position shifted by the pitch of half a pixel in the X-axis direction from the above first position and adjust the field of view of the camera 5 to a second position in the predetermined inspection area on the printed circuit board 2.

At the same time, the control device 6 controls switchover of the liquid crystal grids 4*b* of the illumination device 4 to set the configuration of grids formed by the liquid crystal grids 4*b* corresponding to the period (fringe pitch) of a second light pattern and adjust the position of the grids to a predetermined reference position (phase of "0 degree").

On completion of the positioning of the printed circuit board 2 and the switchover and setting of the illumination device 4, the control device 6 starts an imaging process using the second light pattern.

For example, the control device 6 triggers light emission from the light source 4*a* of the illumination device 4 by means of the illumination controller 22 to start irradiation with the second light pattern, while driving and controlling the camera 5 by means of the camera controller 21 to take an image of an inspection area portion (second position) irradiated with the second light pattern. The image data taken by the camera 5 are transferred to and stored in the image data storage unit 24.

The imaging process using the second light pattern at the second position is performed only once with the second light pattern at the phase of "0 degree". According to this embodiment, only one image data taken with the second light pattern at the phase of "0 degree" are accordingly obtained with respect to the second position in the predetermined inspection area.

The control device 6 then calculates a phase $\theta_2$ of the second light pattern with respect to each pixel, based on the one image data (luminance values) taken with the second light pattern at the second position and the values of the gain A and the offset B stored in the gain offset storage unit 25.

The control device 6 subsequently calculates a second height measurement value with respect to each pixel using the phase $\theta_2$ calculated as described above, based on the principle of triangulation, and stores the calculated second height measurement value in the measurement value storage unit 27.

During this process, the control device 6 drives and controls the motors 15 and 16 to move the printed circuit board 2 to a position obliquely shifted by the pitch of half a pixel from the above first position (i.e., a position shifted by the pitch of half a pixel in the Y-axis direction from the above second position) and adjust the field of view of the camera 5 to a third position in the predetermined inspection area on the printed circuit board 2.

At the same time, the control device 6 controls switchover of the liquid crystal grids 4_b_ of the illumination device 4 to set the configuration of grids formed by the liquid crystal grids 4_b_ corresponding to the period (fringe pitch) of the first light pattern and adjust the position of the grids to the predetermined reference position (phase of "0 degree").

On completion of the positioning of the printed circuit board 2 and the switchover and setting of the illumination device 4, the control device 6 starts an imaging process using the first light pattern.

For example, the control device 6 triggers light emission from the light source 4_a_ of the illumination device 4 by means of the illumination controller 22 to start irradiation with the first light pattern, while driving and controlling the camera 5 by means of the camera controller 21 to take an image of an inspection area portion (third position) irradiated with the first light pattern. The image data taken by the camera 5 are transferred to and stored in the image data storage unit 24.

The imaging process using the first light pattern at the third position is performed only once with the first light pattern at the phase of "0 degree". According to this embodiment, only one image data taken with the first light pattern at the phase of "0 degree" are accordingly obtained with respect to the third position in the predetermined inspection area.

The control device 6 then calculates a phase $\theta_3$ of the first light pattern with respect to each pixel, based on the one image data (luminance values) taken with the first light pattern at the third position and the values of the gain A and the offset B stored in the gain offset storage unit 25.

The control device 6 subsequently calculates a third height measurement value with respect to each pixel using the phase $\theta_3$ calculated as described above, based on the principle of triangulation, and stores the calculated third height measurement value in the measurement value storage unit 27.

During this process, the control device 6 drives and controls the motors 15 and 16 to move the printed circuit board 2 to a position shifted by the pitch of half a pixel in the Y-axis direction from the above first position (i.e., a position shifted by the pitch of half a pixel in the X-axis direction from the above third position) and adjust the field of view of the camera 5 to a fourth position in the predetermined inspection area on the printed circuit board 2.

At the same time, the control device 6 controls switchover of the liquid crystal grids 4_b_ of the illumination device 4 to set the configuration of grids formed by the liquid crystal grids 4_b_ corresponding to the period (fringe pitch) of the second light pattern and adjust the position of the grids to the predetermined reference position (phase of "0 degree").

On completion of the positioning of the printed circuit board 2 and the switchover and setting of the illumination device 4, the control device 6 starts an imaging process using the second light pattern.

For example, the control device 6 triggers light emission from the light source 4_a_ of the illumination device 4 by means of the illumination controller 22 to start irradiation with the second light pattern, while driving and controlling the camera 5 by means of the camera controller 21 to take an image of an inspection area portion (fourth position) irradiated with the second light pattern. The image data taken by the camera 5 are transferred to and stored in the image data storage unit 24.

The imaging process using the second light pattern at the fourth position is performed only once with the second light pattern at the phase of "0 degree". According to this embodiment, only one image data taken with the second light pattern at the phase of "0 degree" are accordingly obtained with respect to the fourth position in the predetermined inspection area.

The control device 6 then calculates a phase $\theta_4$ of the second light pattern with respect to each pixel, based on the one image data (luminance values) taken with the second light pattern at the fourth position and the values of the gain A and the offset B stored in the gain offset storage unit 25.

The control device 6 subsequently calculates a fourth height measurement value with respect to each pixel using the phase $\theta_4$ calculated as described above, based on the principle of triangulation, and stores the calculated fourth height measurement value in the measurement value storage unit 27.

The control device 6 subsequently obtains true height data with respect to the entire inspection area, based on the first measurement values, the second measurement values, the third measurement values and the fourth measurement values stored in the measurement value storage unit 27.

The control device 6 first combines the results of measurement obtained at the first position (first height measurement values), the results of measurement obtained at the second position (second height measurement values), the results of measurement obtained at the third position (third height measurement values) and the results of measurement obtained at the fourth position (fourth height measurement values) and performs image processing to summarize the composite results as one measurement result with respect to the inspection area. This processing provides the measurement result equivalent to the measurement result obtained by imaging with an imaging unit that has four times the resolution of the camera 5. The following describes the details of this image processing.

The following description is on the assumption that the resolution of the camera 5 is 4×4 pixels per field of imaging view. In this case, the combining process first generates data including first height measurement values $C_1$ to $C_{16}$, second height measurement values $D_1$ to $D_{16}$, third height measurement values $E_1$ to $E_{16}$ and fourth height measurement values $F_1$ to $F_{16}$ with respect to the respective pixels obtained at the respective first to fourth positions, which are arranged in 8×8 squares as shown in FIG. 10. In order to improve the visualization, as a matter of convenience, squares are filled with dots in a checkered pattern in FIG. 10 (the same applies to FIGS. 11 and 12).

A data replacement process is subsequently performed with respect to the first height measurement values $C_1$ to $C_{16}$ and the third height measurement values $E_1$ to $E_{16}$ to replace the first height measurement values $C_1$ to $C_{16}$ and the third height measurement values $E_1$ to $E_{16}$ with the values taking into account the fringe order.

For example, as shown in FIG. 11, attention is focused on, for example, a first height measurement value $C_6$ in a square surrounded by the thick line. A value "4" obtained by the measurement at the first position is stored as the first height measurement value $C_6$. Values "16", "12, "12, and "16" are respectively stored as surrounding second height measurement values $D_5$ and $D_6$ and fourth height measurement values $F_2$ and $F_6$ adjacent to the first height measurement value $C_6$. Although only these values are shown in FIG. 11, respective height measurement values are similarly stored in all the other positions in the actual state (the same applies to FIG. 12).

Like the above embodiment, when the value of "4(±1) μm" is obtained as the first height measurement value, different fringe orders provide different candidate values "4(±1) μm" and "14(±1) μm" for the true height of solder paste (coordinates to be measured). The fringe order of 1 provides "4(±1) μm" as the actual height, and the fringe order of 2 provides "14(±1) μm" as the actual height.

The data replacement process employs a value closer to an average [(16+12+12+16)/4=14] of the second height measurement values $D_5$ and $D_6$ and the fourth height measurement values $F_2$ and $F_6$ surrounding the first height measurement value $C_6$, between these candidate values "4" and "14" as the optimum value. In other words, this specifies a fringe order in the phase shift method. The data replacement process then replaces the first height measurement value $C_6$ with the value "14" taking into account the fringe order. This series of processing is similarly performed for the respective first height measurement values $C_1$ to $C_{16}$ and the respective third height measurement values $E_1$ to $E_{16}$.

A correction process is subsequently performed to correct the second height measurement values $D_1$ to $D_{16}$ and the fourth height measurement values $F_1$ to $F_{16}$, based on the first height measurement values $C_1$ to $C_{10}$ and the third height measurement values $E_1$ to $E_{16}$ taking into account the fringe order.

For example, as shown in FIG. 12, attention is focused on, for example, a second height measurement value $D_6$ in a square surrounded by the thick line. A value "12" obtained by the measurement at the second position is stored as the second height measurement value $D_6$. Values "14", "12, "12, and "14" after the above replacement process are respectively stored as surrounding first height measurement values $C_6$ and $C_7$ and third height measurement values $E_2$ and $E_6$ adjacent to the second height measurement value $D_6$.

The correction process first calculates an average [(14+12+12+14)/4=13] of these four surrounding first height measurement values $C_6$ and $C_7$ and third height measurement values $F_2$ and $E_6$. The correction process subsequently determines whether the second height measurement value $D_6$ is within the error range "±2" of this average.

When it is determined that the second height measurement value $D_6$ is within the error range "±2", like the above first embodiment, the average of the first height measurement values $C_6$ and $C_7$ and the third height measurement values $E_7$ and $F_6$ is employed as the optimum value for the second height measurement value $D_6$.

When it is determined that the second height measurement value $D_6$ is not within the error range "±2", on the other hand, like the above first embodiment, the observed data of the second height measurement value $D_6$ is employed as the optimum value.

The above series of processing results in generating measurement data that has the accuracy equivalent to the accuracy of measurement data that is obtained from image data taken in 8×8 pixels with respect to the entire field of imaging view (inspection area).

As described above in detail, this embodiment provides the similar functions and advantageous effects to those of the first embodiment described above. This embodiment allows for measurement of the high resolution in the wide measurement range as shown in FIG. 13 and ensures more accurate measurement.

This embodiment is free from the occurrence of data missing portions, in generation of data of the high resolution by combining the respective height measurement values and thereby does not need to perform a data interpolation process to interpolate data. As a result, this provides measurement data further closer to the true values.

The present disclosure is not limited to the description of the above embodiments but may be implemented, for example, by aspects described below. The following description is, however, also only illustrative and the present disclosure may naturally be implemented by any other applications and modifications.

(a) Each of the above embodiments describes the board inspection apparatus 1 configured to measure the height of solder paste printed and formed on the printed circuit board 2 as an implementation of the three-dimensional measurement apparatus. The three-dimensional measurement apparatus is, however, not limited to this configuration but may be implemented by a configuration that measures the height of another object, for example, a solder bump printed on a board or an electronic component mounted on a board.

(b) Each of the above embodiments is configured to use the liquid crystal grids **4*b* to form the grids serving to convert the light emitted from the light source 4*a* into a fringe-like light pattern and control the switchover of the liquid crystal grids 4*b*** to shift the phase of the light pattern. This configuration is, however, not essential, but another employable configuration may convey, for example, a grid member by a conveyance unit such as a piezoactuator and thereby shift the phase of the light pattern.

(c) Each of the above embodiments is configured to move the printed circuit board 2 mounted on the mounting table 3, so as to relatively displace the positional relationship between the camera 5 and the printed circuit board 2. This configuration is, however, not essential, but another employable configuration may move the camera 5 to relatively displace this positional relationship.

(d) In measurement at the first position, each of the above embodiments is configured to measure the height by the phase shift method, based on four image data taken with the first light pattern at the four different phases shifted by 90 degrees each. This configuration is, however, not essential, but another employable configuration may measure the height, for example, based on three image data taken with the first light pattern at three different phases shifted by 120 degrees each. Accordingly, the "first predetermined number" that denotes the frequency of imaging at the first position may be at least a number that allows for measurement of the height by the phase shift method.

(e) The configuration of measuring the height by using known values of the gain A and the offset B based on one image data taken by irradiation with a predetermined light pattern at only one phase without the phase shift is employed in measurement at the second position according to the above first embodiment and in measurement at the second to the fourth positions according to the above second embodiment. This configuration is, however, not essential, but another employable configuration may measure the height by using known values of the gain A and/or the offset B based on two image data taken with a light pattern at two different phases.

Accordingly, the "second predetermined number" that denotes the frequency of imaging at the second position according to the above first embodiment and denotes the frequency of imaging at the second to the fourth positions according to the above second embodiment may be at least a smaller number than the “first predetermined number” that denotes the frequency of imaging at the first position. For example, when a configuration employed measures the height based on four image data taken with a light pattern at four different phases in measurement at the first position, the configuration may measure the height by using known values of the gain A and/or offset B based on three image data taken with a light pattern at three different phases in measurement at the second position or the like. Even this configuration can determine the phase of the light pattern based on a relatively simple arithmetic equation and increase the processing speed, compared with a conventional configuration.

(f) An example of the configuration of measuring the height by using known values of the gain A and/or the offset B based on two image data taken with a light pattern at two different phases may be a configuration that measures the height based on two image data taken with a light pattern having two different phases by 90 degrees.

This configuration specifies a phase $\theta_2$ of the second light pattern, based on known luminance values $V_{20}$ and $V_{21}$ with respect to each pixel on two image data obtained with the second light pattern at the second position or the like and a known value of the offset B obtained with the first light pattern at the first position (as shown by the equation (T8) given above). This configuration determines the phase $\theta_2$ according to the arithmetic equation using “$\tan^{-1}$”. This allows for measurement of the height in the range of 360 degrees from −180 degrees to 180 degrees and thereby further expands the measurement range.

This configuration is, however, not limited to the configuration of measuring the height by using the known values of the gain A and/or the offset B based on the two image data taken with the light pattern having the two different phases by 90 degrees but may be, for example, a configuration of measuring the height by using known values of the gain A and/or the offset B based on two image data taken with a light pattern having two different phases by 180 degrees.

(g) Each of the above embodiments describes the configuration of measuring the height of solder paste up to 20 μm by combining the first light pattern having the period of 10 μm (height resolution of 2 μm) and the second light pattern having the period of 20 μm (height resolution of 4 μm). The periods and the measurement ranges of the respective light patterns are, however, not limited to this configuration.

Each of the above embodiments is configured to obtain the values of the gain A and/or the offset B, based on four image data taken with the first light pattern of the shorter period (period of 10 μm). This configuration is, however, not essential, but another employable configuration may obtain the values of the gain A and/or the offset B, based on image data taken with the second light pattern of the longer period (period of 20 μm).

(h) Each of the above embodiments is configured to expand the measurement range by irradiation with two different light patterns having different periods. This configuration is, however, not essential, but the first light pattern and the second light pattern may be light patterns having an identical period (for example, both having a period of 10 μm).

The above second embodiment may be configured to expand the measurement range by irradiation with three or more different light patterns having different periods. For example, the configuration may perform irradiation with a light pattern having a period c at the first position, irradiation with a light pattern having a period β at the second position, irradiation with a light pattern having a period γ at the third position and irradiation with a light pattern having a period r at the fourth position.

(i) Each of the above embodiments is configured to store the height measurement values as the first measurement value and the second measurement value in the measurement value storage unit 27. This configuration is, however, not essential, but another employable configuration may store phase measurement values (for example, phases $\theta_1$ and $\theta_2$) as the first measurement value and the second measurement value.

(j) The procedures of the correction process of, for example, the height measurement values and the interpolation process of the data missing portions are not limited to those described in the above respective embodiments, but other techniques may be employed for the same purpose.

(k) Each of the above embodiments employs the configuration of using the values of the gain A and the offset B obtained at an identical position of coordinates (identical pixel) of the imaging element of the camera 5, in order to obtain, for example, a height measurement value with respect to a predetermined pixel, based on one image data taken at the second position or the like using the values of the gain A and/or the offset B.

This configuration is, however, not essential. In order to obtain a height measurement value with respect to a predetermined pixel, another employable configuration may use an average of the gain A and/or an average of the offset B in peripheral locations of the predetermined pixel (i.e., an average of the gain A and/or an average of the offset B of pixels adjacent to the predetermined pixel). For example, as shown in FIG. 14, in order to obtain a second height measurement value with respect to a pixel $Q_1$ in image data taken at the second position (area surrounded by the thick line), the configuration may use an average of the gain A and/or an average of the offset B with respect to four pixels $P_1$, $P_2$, $P_3$ and $P_4$ (areas filled with dots in the drawing) that respectively include parts of the imaging range of the pixel $Q_1$ in image data taken in the peripheral locations of the pixel $Q_1$, i.e., image data taken at the first position.

This configuration is naturally not essential, but another employable configuration may use at least one of: an average of the gain (value) A and an average of the offset (value) B with respect to any two or three pixels among the pixels $P_1$, $P_2$, $P_3$ and $P_4$.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1 board inspection apparatus, 2 printed circuit board, 4 illumination device, **4*a* light source, 4*b* liquid crystal grids, 5 camera, 6 control device, 22 illumination controller, 23 motor controller, 24 image data storage unit, 25 gain offset storage unit, 26 three-dimensional measurement unit, 27 measurement value storage unit, 28** height data acquisition unit, A gain, B offset

What is claimed is:

1. A three-dimensional measurement apparatus comprising:

an illumination device that irradiates a measurement object with a first and a second light pattern each having a fringe-like light intensity distribution;

a camera that takes image data of the measurement object irradiated with the first and the second light pattern;

a motor that displaces a position of the measurement object with respect to the camera; and a processor that: three-dimensionally measures the measurement object based on the image data, obtains a first measurement value of the measurement object per pixel based on a first predetermined number of image data taken with the first light pattern at a first predetermined number of phases at a first position, obtains at least one of a gain value and an offset value per pixel based on the first predetermined number of image data, obtains a second measurement value of the measurement object per pixel based on: the one of the gain value and the offset value, and a second predetermined number of image data taken with the second light pattern at a second predetermined number of phases at a second position shifted by a haft of a pixel in a predetermined direction from the first position, wherein the second predetermined number is smaller than the first predetermined number, obtains height data of the measurement object per pixel based on the first and the second measurement value, and obtains the second measurement value per pixel by using an average of the one of the gain value and the offset value of pixels adjacent to each pixel of the image data, the first predetermined number of image data is three or four the first predetermined number of image data is taken with the first light pattern at phases of 0, 120, and 240 degrees or at phases of 0, 90, 180, and 270 degrees, and the second predetermined number of image data is one or two the second predetermined number of image data is taken with the second light pattern at a phase of 0 degree.

2. The three-dimensional measurement apparatus according to claim 1, wherein the illumination device irradiates the measurement object by switching a plurality of light patterns having different periods, the measurement object is irradiated at the first position with the first light pattern having a first period, and the measurement object is irradiated at the second position with the second light pattern having a second period different from the first period.

3. The three-dimensional measurement apparatus according to claim 1, wherein when the second predetermined number is one, the processor obtains the second measurement value by calculating a phase θ of the second light pattern that satisfies the following equation (S1):

$$V_0=A \sin \theta+B \quad \text{(S1)}$$

where $V_0$ denotes a luminance value, A denotes the gain value, and B denotes the offset value.

4. The three-dimensional measurement apparatus according to claim 2, wherein when the second predetermined number is one, the processor obtains the second measurement value by calculating a phase θ of the second light pattern that satisfies the following equation (S1):

$$V_0=A \sin \theta+B \quad \text{(S1)}$$

where $V_0$ denotes a luminance value, A denotes the gain value, and B denotes the offset value.

5. The three-dimensional measurement apparatus according to claim 1, wherein when the second predetermined number is two, the processor obtains the second measurement value by calculating a phase θ of the second light pattern that satisfies the following equations (T1) and (T2):

$$V_0=A \sin \theta+B \quad \text{(T1)}$$

$$V_1=A \sin(\theta+90.\text{degree.})+B \quad \text{(T2)}$$

where $V_0$ and $V_1$ denote luminance values of two image data, A denotes the gain value, and B denotes the offset value.

6. The three-dimensional measurement apparatus according to claim 2, wherein when the second predetermined number is two, the processor obtains the second measurement value by calculating a phase θ of the second light pattern that satisfies the following equations (T1) and (T2):

$$V_0=A \sin \theta+B \quad \text{(T1)}$$

$$V_1=A \sin(\theta+90.\text{degree.})+B \quad \text{(T2)}$$

where $V_0$ and $V_1$ denote luminance values of two image data, A denotes the gain value, and B denotes the offset value.

7. The three-dimensional measurement apparatus according to claim 1, wherein the measurement object is one of solder paste printed on a printed circuit board and a solder bump formed on a wafer substrate.

8. The three-dimensional measurement apparatus according to claim 2, wherein the measurement object is one of solder paste printed on a printed circuit board and a solder bump formed on a wafer substrate.

9. The three-dimensional measurement apparatus according to claim 3, wherein the measurement object is one of solder paste printed on a printed circuit board and a solder bump formed on a wafer substrate.

10. The three-dimensional measurement apparatus according to claim 4, wherein the measurement object is one of solder paste printed on a printed circuit board and a solder bump formed on a wafer substrate.

11. The three-dimensional measurement apparatus according to claim 5, wherein the measurement object is one of solder paste printed on a printed circuit board and a solder bump formed on a wafer substrate.

12. The three-dimensional measurement apparatus according to claim 6, wherein the measurement object is one of solder paste printed on a printed circuit board and a solder bump formed on a wafer substrate.

13. A three-dimensional measurement method comprising:

irradiating a measurement object with a first and a second light pattern each having a fringe-like light intensity distribution;

taking, using a camera, image data of the measurement object irradiated with the first and the second light pattern;

displacing a position of the measurement object with respect to the camera, three-dimensionally measuring the measurement object based on the image data, obtaining a first measurement value of the measurement object per pixel based on a first predetermined number of image data taken with the first light pattern at a first predetermined number of phases at a first position, obtaining at least one of a gain value and an offset value per pixel based on the first predetermined number of image data, obtaining a second measurement value of the measurement object per pixel based on: the one of the gain value and the offset value, and a second predetermined number of image data taken with the second light pattern at a second predetermined number of phases at a second position shifted by a half of a pixel in a predetermined direction from the first position, wherein the second predetermined number is smaller than the first predetermined number, the method further comprises obtaining height data of the measurement object per pixel based on the first and the second measurement value, and obtaining the second measurement value per pixel by using an average of the one of the gain value and the offset value of pixels adjacent to each pixel of the image data, the first predetermined number of image data is three or four the first predetermined number of image data is taken with the first light pattern at phases of 0, 120, and 240 degrees or at phases of 0, 90, 180, and 270 degrees, and the second predetermined number of image data is one or two the second predetermined number of image data is taken with the second light pattern at a phase of 0 degree.

* * * * *